Dec. 14, 1954   C. W. MOTT   2,696,889
POWER-DRIVEN LAWN MOWER AND CONTROL THEREFOR
Filed July 29, 1948   5 Sheets-Sheet 1
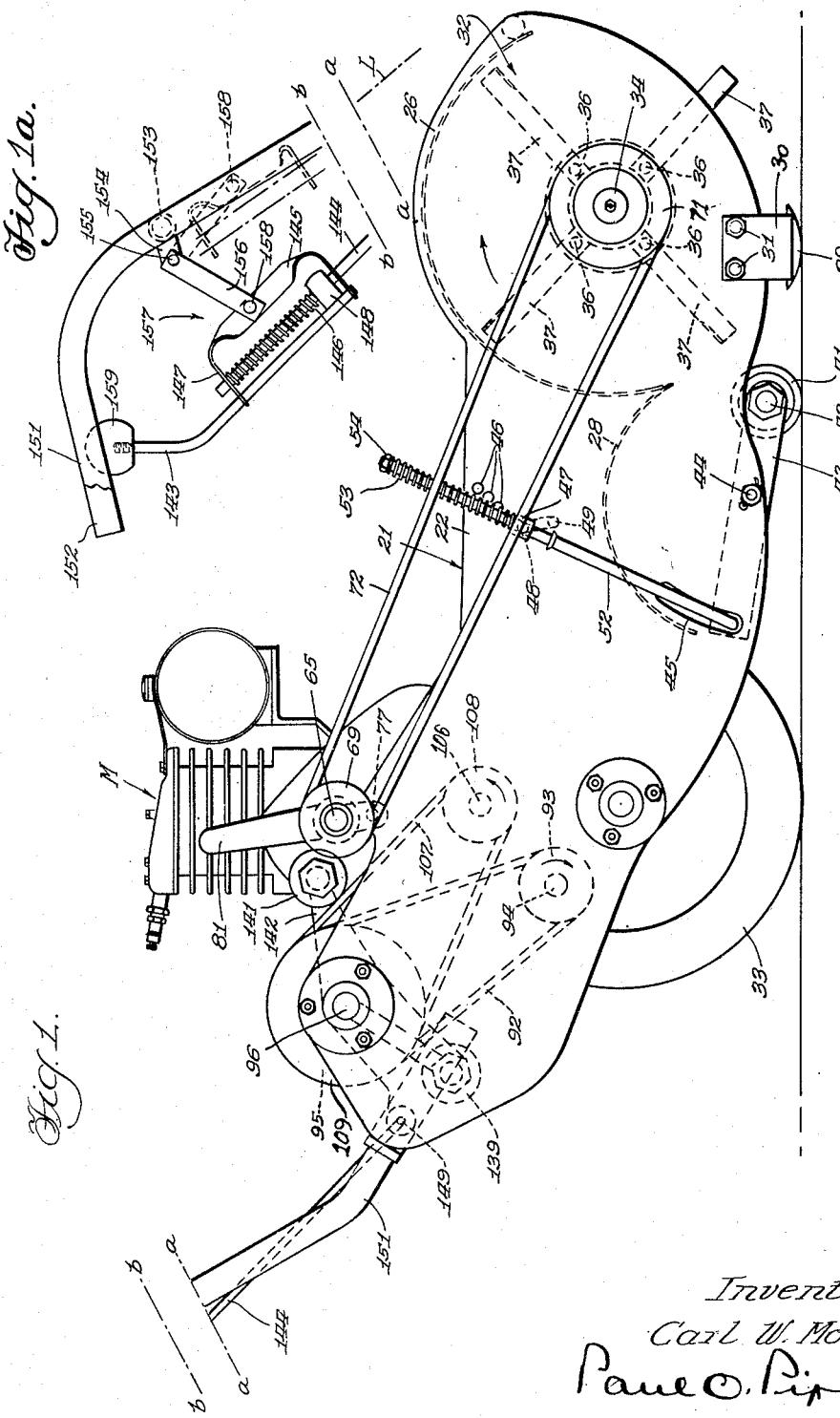
Inventor
Carl W. Mott
Paul O. Pippel
Atty.

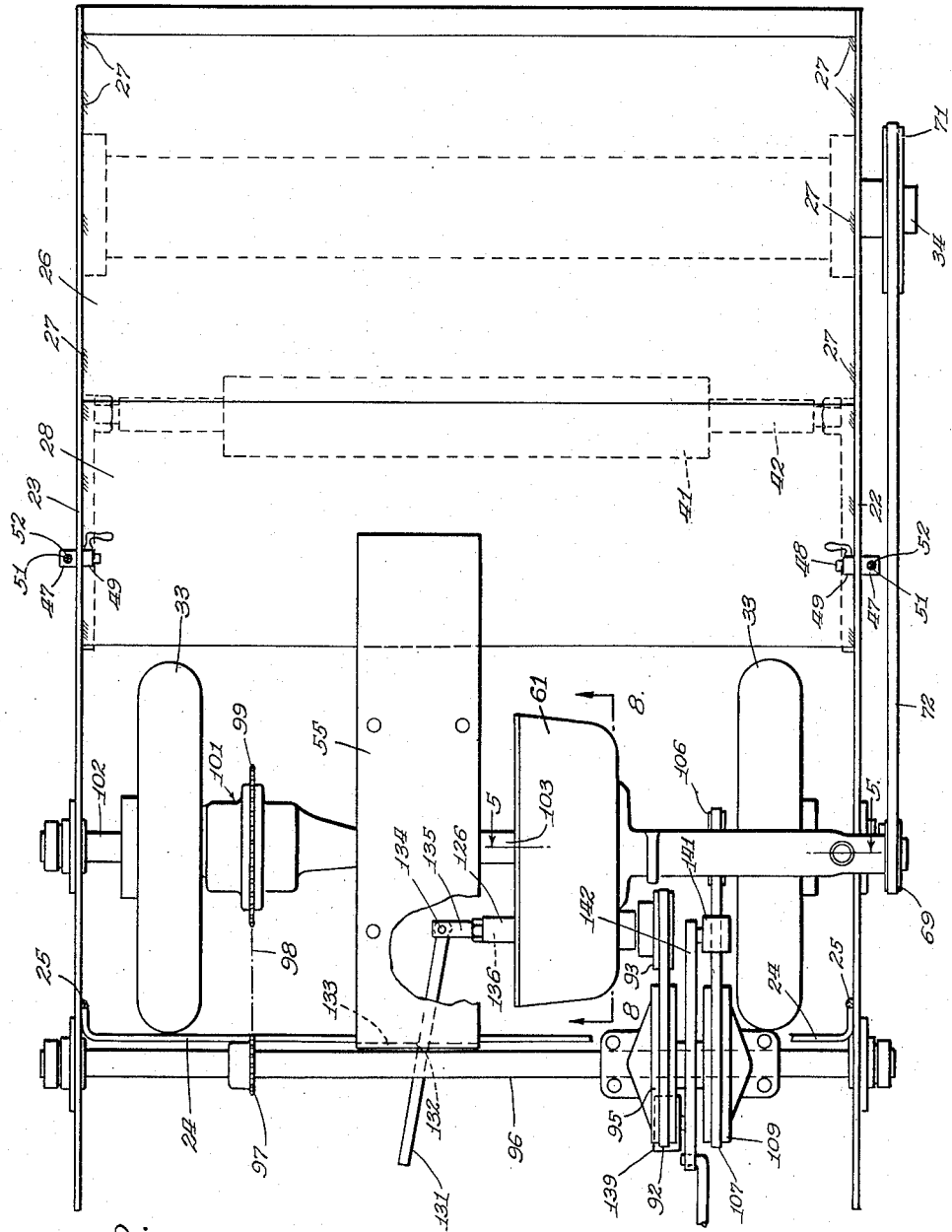

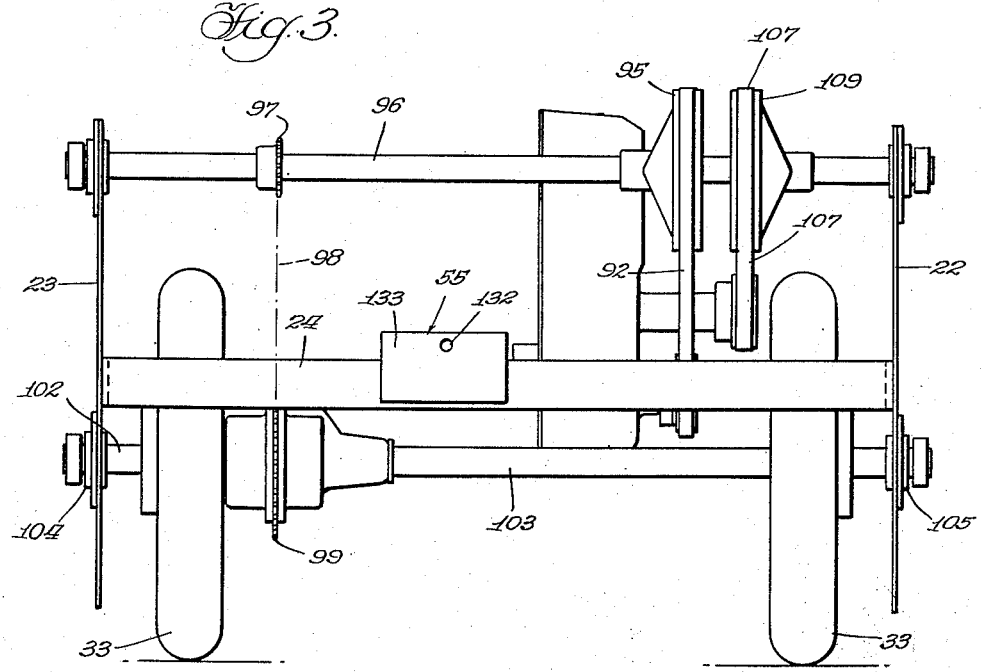
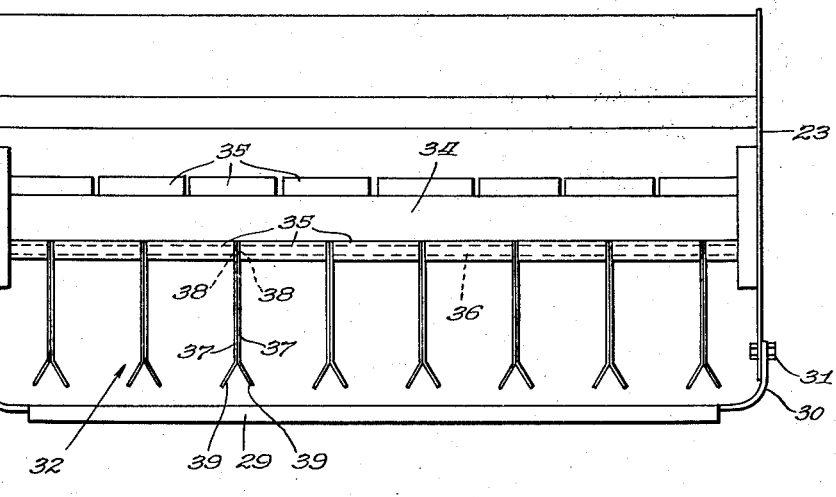

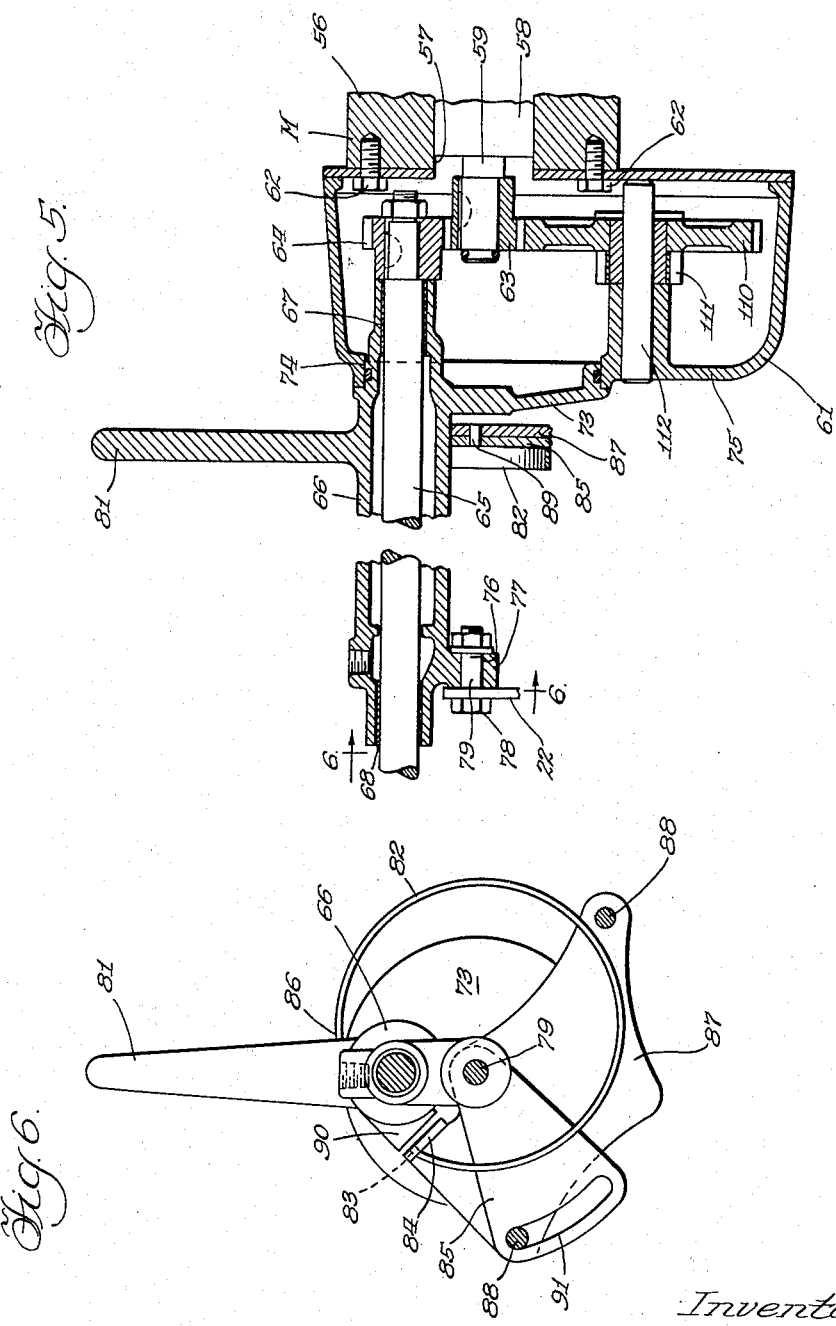

Dec. 14, 1954  C. W. MOTT  2,696,889
POWER-DRIVEN LAWN MOWER AND CONTROL THEREFOR
Filed July 29, 1948  5 Sheets-Sheet 5

Inventor:
Carl W. Mott

United States Patent Office 2,696,889
Patented Dec. 14, 1954

2,696,889

POWER-DRIVEN LAWN MOWER AND CONTROL THEREFOR

Carl W. Mott, Lake Ozark, Mo., assignor to International Harvester Company, a corporation of New Jersey Application July 29, 1948, Serial No. 41,343

7 Claims. (Cl. 180—19)

This invention relates to power-driven lawn mowers and wherein there are features particularly useful in such mowers of the walk-behind type.

The embodiment herein disclosed for illustrating the invention comprises a frame mounted upon a running gear having motor-driven traction wheels spaced apart transversely of a rear portion of the frame. A power-driven grass-cutting rotor assembly extends across a front portion of the frame and has a plurality of knife-like flails pivotally mounted upon a rotatable carrier. When the rotor assembly is power driven the flails swing into the grass for cutting same and chopping it into short pieces. Handles for engagement by an operator walking behind the mower unit project upwardly and rearwardly from the rear portion of the frame. An internal combustion engine is carried by the frame as a power source for driving the traction wheels and the grass-cutting rotor assembly.

One object of the invention is the provision of a novel type of mounting for a drive shaft and drive pulley for operating or driving a belt which extends from such pulley to a pulley that is constrained for rotation with the grass-cutting rotor assembly. This novel mounting facilitates manual displacement of said shaft and the drive pulley to or from a position in which the belt will be tightened and thereby made effective for transmitting power between the pulleys. This feature of the invention utilizes gearing in such an arrangement that a component of driving force imparted to a gear upon the drive shaft urges displacement thereof and of the pulley thereon into the position for causing the belt to be tightened.

A further object is the provision of a gear box containing gearing driven from the motor and for driving a plurality of pulley shafts of which the pulley on one is for cooperating with a belt for driving the grass-cutting rotor and which shafts a pulley on another is for operating a belt through which power is transmitted to the traction wheels of the mower.

A further object is the provision of a gear box having oppositely driven shafts with respective pulleys having belts trained respectively thereover and over pulleys on a cross shaft from which power is transmitted to traction wheels in a forward or reverse direction in accordance with which one of the belts is tightened in power transmitting relation upon its pulleys.

Another object is the provision of a walk-behind power-driven mower wherein there are reversely-driven belts selectively tightenable for establishing a reverse or a forward driving connection between the motor and traction wheels, together with a belt-tightener mechanism operable by a forwardly directed manual force upon a control member to establish the driving connection of the forward driving belt and operable responsively to a rearward manual force upon the control member for tightening the reverse driving belt to establish its driving connection.

A further object is the provision of a mower according to the next preceding object wherein an over-center device is operated by the manual control member to retain the forward drive belt tightened until such time as a rearward manual force is applied to the control member.

The above and other desirable more specific objects inherent in and encompassed by the invention will become apparent from the ensuing description, the appended claims, and the drawings, wherein:

Figs. 1 and 1a complementally constitute a side elevational view of a motor-driven walk-behind lawn mower embodying a preferred form of the invention.

Fig. 2 is a plan view of the mower shown in Fig. 1, but omitting the control handles and the internal combustion engine.

Fig. 3 is a rear elevational view of the mower frame, running gear, gear box, and forward and reverse drive belts through which power is transmittable from gearing in the gear box to the running gear.

Fig. 4 is a front elevational view of the mower, illustrating the grass-cutting rotor assembly.

Fig. 5 is an enlarged vertical sectional view taken substantially on the line 5—5 of Fig. 2, illustrating an eccentric mounting of an outboard bearing on the gear box, together with gearing for imparting drive to a shaft in the outboard bearing and for urging said bearing and the shaft to revolve in a direction for tightening a belt driven by a pulley mounted upon the shaft.

Fig. 6 is a view looking endwise of the outboard bearing of Fig. 5 and taken on the line 6—6 of such figure, illustrating a semi-circular spring and adjustable mounting therefor adapting the spring to supplement the force component of the gearing tending to revolve such bearing in the direction for causing tightening of a belt driven by a pulley mounted upon a shaft journalled in such bearing.

Figure 7:
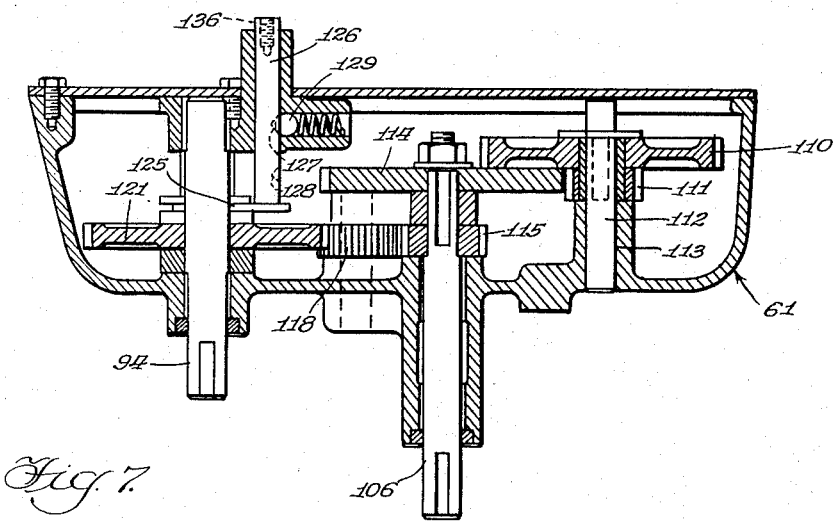
Fig. 7 is a horizontal view taken sectionally through the gear box substantially on the line 7—7 of Fig. 8, and illustrating the gearing driving connections for a forward pulley shaft and for a reverse pulley shaft.

With continued reference to the drawings and particularly to Figs. 1, 2 and 3, a frame 21 of the mower can be seen to comprise a pair of laterally spaced plate-like side frame members 22 and 23. These side frame members are connected together at rear edge portions by a cross-frame member 24. The cross-frame member 24 may be welded to the two side frame members as indicated at 25, in Fig. 2. A semi-cylindrical rotor shroud 26 extends between forward portions of the side frame members and constitutes means for rigidly connecting these members. The shroud 26 may be welded to the side frame members as shown at 27, in Fig. 2. A semi-cylindrical deflector extension 28 (see Fig. 1) of the shroud 26 also extends between the side frame members to which it is welded at its ends to constitute a part of the frame and to rigidify same. A runner bar 29, Figs. 1 and 4, has upturned end portions 30 respectively secured to the side frame members by bolts 31. This runner bar is directly beneath the grass-cutting rotor assembly 32 and limits the proximity with which said assembly can approach the ground. This runner bar is adapted to slide upon the ground and to cooperate with traction wheels 33 for supporting the frame.

The rotor assembly 32 comprises a shaft 34 extending between and through the side frame members 22 and 23 wherein opposite end portions of such shaft are respectively journalled. There are four sets of axially aligned and axially spaced flail pivot rod holders 35 carried by the shaft 34. These sets of flail pivot rod holders are equally spaced circumferentially of the shaft. Flail pivot rods 36 are slid endwise respectively into these sets of axially aligned holders 35, the upper set of the holders 35 illustrated in Fig. 4 having the rod withdrawn therefrom. Prior to the endwise insertion of each rod 35 into the tubular holders 35 therefor pairs of grass-cutting flails 37 will be placed in back-to-back relation as illustrated in Fig. 4, and have apertures 38 in shank portions thereof aligned with and disposed between axially spaced ends of the holders 35 so that as the rod is slid into place in the holders it will pass through the apertured shanks of the flails to provide a pivotal support thereto. During rotation of the rotor assembly the flails 37 will be caused to swing radially outwardly from the axis of the shaft 34, as illustrated in Fig. 1, because of centrifugal force. Diverging end portions 39 of each pair of back-to-back arranged flails 37 collide with and cut the grass when the rotor assembly is rotated at high speed.

Locomotion of the mower over the ground surface is made easier by a ground-engaging roller 41 which is rotatively carried upon a shaft 42 having its opposite ends mounted in forward end portions of levers 43. These levers 43 are mounted adjacently to the inner sides of the side frame members 22 and 23 where they are pivotally carried upon bolts 44. Each side frame member 22 and 23 has an upwardly extending slot 45 adjacently to the rear end portion of the associated lever 43. A plurality of vertically spaced openings 46 is in each of the side frame members 22 and 23, above the slot 45 therein. A spring mounting member having a head 47 and a shank 48 is associated with each set of openings 46. The shank 48 of each headed spring mounting member is inserted in one of the associated openings 46. Subsequent to insertion of the shanks 48 through a selected opening 46, a crank nut 49 is turned thereonto, as illustrated in Fig. 2.

A bearing 51 in each spring mounting member head 47 slidably receives a vertical rod 52. The lower end portion of each rod is turned laterally and inserted inwardly through the associated frame member slot 45 into pivotal connection with the rear end of the associated rockable lever 43. An upper end portion of each rod 52 above the spring mounting member 47 is surrounded by a helical expansion spring 53 which reacts between its associated head 47 and a nut 54 on the upper end of its associated rod 52 for urging the rod upwardly, thereby urging the levers 43 to pivot in the direction carrying the front ends thereof downwardly for pressing the ground-engaging roller 41 against the ground. In this manner weight of the mower is transferred from the runner bar 29 onto the ground-engaging roller, thereby diminishing frictional engagement of the runner bar with the ground and diminishing the tractive force necessary for causing movement of the mower over the ground surface.

Should it be desired to cause the grass to be cut at greater length than the shortest length possible when the runner bar slides along the ground surface, spring mounting members having heads 47 will be moved upwardly into higher of the openings 46 for causing sufficient downward displacement of the ground-engaging roller 41 for transferring all of the weight from the runner bar onto such roller and selectively raising the runner bar above the ground surface.

A motor M for driving the grass-cutting rotor assembly 32, and also for driving the traction wheels 33 of the mower, is mounted upon a motor-supporting platform 55, Figs. 2 and 3. The rear end of the platform 55 is supported upon the transverse frame member 24, whereas the forward end of such platform is mounted upon the shroud extension 28.

The motor M herein illustrated is an internal combustion engine. In Fig. 5, a section of the crankcase 56 of the motor M is shown together with a crankcase opening 57 which contains a bearing 58 through which an end of the engine crankshaft 59 projects outwardly into a gear box 61. One wall of the gear box is secured to the engine crankshaft by capscrews 62. A driving gear 63, which is constrained for rotation with the engine crankshaft, meshes with and drives a companion driven gear 64 mounted upon and constrained for rotation with a power-transmitting pulley driving shaft 65. This latter shaft extends through and is journalled in an outboard bearing 66 having bearing sleeves 67 and 68 respectively in inner end and outer end portions thereof. A pulley 69, Figs. 1 and 2, is mounted on and constrained for rotation with the outer end portion of the shaft 65. Pulley 69 is disposed in a common plane with a pulley 71 mounted on and constrained for rotation with an outer end portion of the rotor assembly shaft 34. A belt 72 trained over the pulleys 69 and 71 is adapted to transmit driving force from the pulley 69 to the pulley 71 when this belt is tightened.

The outboard bearing 66 is formed integrally with a bearing carrier 73 which is circular and which is oscillatively mounted in a circular opening 74 in a side wall 75 of the gear box 61. In Figs. 5 and 6 it can be seen that the axis of the outboard bearing 66 is in radially spaced parallelism with the axis of the carrier 73. It can also be seen that a bearing hole 76 in a boss 77, depending from an outer end portion of the outboard bearing 66, is coaxial with the oscillative carrier 73. A bolt 78 anchored in an upper edge portion of the side frame member 22 has its shank 79 disposed within the bearing hole 76. Bolt shank 79 and bearing hole 76 constitute pivot bearing counterparts cooperable with the carrier 73 for oscillatively supporting the outboard bearing 66. Endwise movement of the bearing carrier from the opening 74 is prevented by abutment of the boss 77 against the frame member 22.

Figure 8:
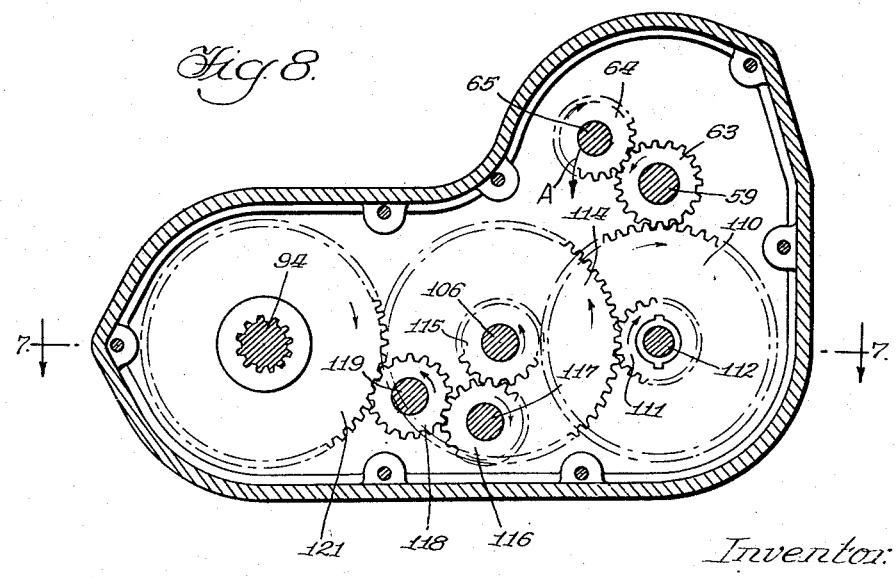
Fig. 8 is an enlarged vertical sectional view taken through the gear box on the line 8—8 of Fig. 2.

The motor crankshaft 59 rotates counter-clockwise as viewed in Fig. 8 wherefore the gear 63, in addition to rotating the companion driven gear 64 clockwise as viewed in Fig. 8, imparts to said gear 64 a force in the direction of the arrow A, Fig. 8, tending to pivot the carrier 73 and thereby revolve this gear, the power transmitting shaft 65, and the outboard bearing 66 counter-clockwise about the axis of the carrier 73 as viewed in Fig. 6. Such counter-clockwise pivoting of the carrier 73 displaces the pulley 69, Fig. 1, for tightening the belt 72. Therefore the gear 63 develops a servo-action tending to maintain the belt 72 tightened following manipulation of an operating handle 81, Figs. 1, 5 and 6, for initially rocking the carrier 73 for tightening said belt. This servo-action of the gear 63 is supplemented by a semi-circular spring 82, Fig. 6, having one end 83 anchored in a flange 84 of a pivotally adjustable member 85 and having its opposite end, 86, pressing against a footing portion of the handle 81. A mounting plate 87 secured by means of bolts 88 upon the side wall 75 of the gear box carries a pivot stud coaxially with the carrier 73 and on which the member 85 is pivotally mounted. Pivotal adjustment of the member 85 determines the position of the flange 84 which is abutted by a boss 90 on the outboard bearing 66 for limiting the distance the bearing 66 can revolve about the axis of the carrier 73 for tightening the belt so the belt will not be overstressed. Adjustment of the member 85, and consequently of the flange 84, is maintained by a nut (not shown) threaded onto the shank of the bolt 88 which passes through an arcuate slot 91 in the member 85.

Forward motion of the mower is obtained by power derived from the motor M when a "forward" belt 92 is tightened in driving relation between a "forward" pulley 93 mounted on the outer end of a driven shaft 94 projecting outwardly from the gear box 61. When so tightened the belt 92 will transmit power from the pulley 93 to a pulley 95 which is mounted on and constrained for rotation with a cross shaft 96. This cross shaft carries a sprocket 97 for rotation therewith and from which power is transmitted through a chain 98 to a sprocket 99 incorporated into a differential casing 101. When the casing 101 is rotated, it causes differential rotation of axle shafts 102 and 103 projecting oppositely therefrom. The details of this differential unit are disclosed and claimed in my copending application Serial No. 313,439, which is a division hereof. The traction wheels 33 are respectively secured to the axle shafts 102 and 103. The axle shafts 102 and 103 which constitute a traction wheel shaft structure 102—103 are carried rotatively in bearing units 104 and 105 which are supported in side frame members 23 and 22 of the mower frame. A running gear for the mower includes the two shafts 102 and 103 and the two traction wheels 33.

Referring now to Figs. 5, 7 and 8, a plurality of power trains are there shown for transmitting power from the motor shaft 59 to the "forward" pulley shaft 94 and to a "reverse" pulley shaft 106. There are two power trains selectively establishable in driving relation between the motor shaft 59 and the "forward" pulley shaft 94 for driving the forward pulley shaft at either of two speeds. A single power train remains established in driving relation between the motor shaft and the "reverse" pulley shaft 106. Power is transmitted from the "reverse" pulley shaft to the cross shaft 96 and thence to the running gear of the mower only when the "forward" belt 92 is loosened and a "reverse" belt 107 is tightened in driving relation upon a "reverse" pulley 108 and a pulley 109 fixed for rotation with cross shaft 96. The belts 92 and 107, the pulleys associated therewith and selective tightening means including idlers 139 and 141 constitute initially slipable load-pickup drive connecting means.

The low speed forward power train includes a gear 110, Figs. 7 and 8, which is driven by the motor shaft gear 63, a smaller gear 111 which is connected with the gear 110 to rotate therewith on a bearing rod 112 held in a casing bore 113, a gear 114 which is mounted on and constrained for rotation with the "reverse" pulley shaft 106, a gear 115 which is also constrained for rotation with the "reverse" pulley shaft, a gear 116 mounted on a bearing stud 117, a gear 118 mounted on a bearing stud 119 and a gear 121 constrained for rotation with the "forward" pulley shaft 94, but slidably endwise thereof. By referring to the arrows associated with the various gears in Fig. 8 it can be ascertained that the motor shaft gear 63, which is rotated counter-clockwise, will cause clockwise rotation of the gear 121 and of the forward pulley shaft 94.

The slidable gear 121 has its axial position controlled by a shifter fork 125 upon the inner end of an axially-slidable control rod 126. This rod has a pair of axially spaced detent notches 127 and 128 for cooperating with a spring-pressed detent ball 129. When the gear 121 is in the position shown meshing with the small gear 118 for establishing the slow speed "forward" driving train, the notch 127 receives the detent ball 129 to yieldably retain the gear 121 in shifted position. By moving the rod 126 endwise outwardly for carrying the gear 121 out of mesh with the gear 118 and into mesh with the relative larger gear 114, a higher speed "forward" driving train is established, and this second position of the gear 121 is yieldably maintained by the detent ball 129 while projecting into the detent notch 128.

In Fig. 2 there is shown a shifter lever 131 projecting forwardly through a hole 132 in a dependent flange 133 at the rear end of the motor supporting platform 55. The forward end of the lever 131 is pivotally connected at 134 with a member 135 which has a threaded shank portion turned into a threaded recess 136, Fig. 7, in the outer end of the shifter rod 126.

The power train for driving the "reverse" pulley shaft 106 comprises the gears 110, 111 and 114, the latter being keyed for rotation with the shaft 106. In Fig. 8 it can be ascertained from the arrows associated with the gears that the shaft 106 is driven in the opposite direction with respect to the forward (2 speed) driven shaft 94. The shafts 106 and 94 are continuously driven, the shaft 106 at constant speed and the shaft 94 at either of the two speeds selectable by meshing the gear 121 with the gear 118 or with the gear 114. The pulleys 93 and 108 respectively upon the outer ends of these two shafts are selectively drivingly connected with cross shaft pulleys 95 and 109 by the belts 92 and 107 respectively, depending upon which of the belts is tightened in driving relation upon its associated paired pulleys.

Selective tightening and loosening of the "forward" and "reverse" drive belts 92 and 107 is accomplished by means of belt tightening idlers 139 and 141 rotatively disposed upon a carrier member 142, which is rockably mounted upon the cross shaft 96. This oppositely movable or rockable member 142 normally depends in a neutral position illustrated in Fig. 1 where neither of the idlers 139 nor 141 presses against its respectively associated belt for tightening the same. Rocking the pivoted member 142 couter-clockwise, as viewed in Fig. 1, will displace the idler 141 more distantly from its associated belt 107 while placing the idler 139 in belt tightening relation with respect to the "forward" belt 92. Clockwise pivoting of the member 142 from the neutral position shown in Fig. 1 will move the idler 139 farther from its associated belt 92 pursuant to carrying the idler 141 into belt tightening relation with the "reverse" belt 107.

Rocking of the idler carrier member 142 selectively to and from the positions on opposite sides of the neutral is accomplished by manipulating a control element 143, Fig. 1a, and a rod element 144 which is connected to the element 143 by an inverted U-shaped bracket 145 slidably on the rod 144, and a helical spring 146 disposed between an end portion 147 of the bracket and a stop 148 on the rod 144. The lower end of the rod 144 is pivotally connected with the idler carrier 142 by a pin 149. Handle members 151 and 152 respectively connected with rear end portions of the side frame members 22 and 23 are interconnected by a transverse tubular brace member 153, Fig. 1a. This brace member 153, together with handles 151 and 152, serves as a control support for supporting the control mechanism for the belt tightening idlers. A bracket 154 mounted on the transverse member 153 pivotally supports, at 155, a pendulous pivot element 156 of toggle mechanism which, in addition to including said element 156, also includes the rod element 144 and an articulated joint structure 157 interconnecting said elements 156 and 144. Said joint structure 157 includes a pivot connection 158 between the pendulous element 156 and the inverted U-shaped bracket 145.

The toggle mechanism is illustrated in Fig. 1a in a relaxed condition which permits the pendulous belt tightened idler carrier 142 to depend idly in the neutral position. Should the operator desire to cause the mower to move forwardly, he will grasp a knob 159 on the control element 143 and press forwardly upon this knob. This will cause the pivot 158 of the toggle mechanism to swing forwardly to the dotted line position illustrated in Fig. 1, carrying the pivot 158 above and forwardly of a center line L passing through the pivot 155 and the pivot 149 at the lower end of the rod 144. As the toggle mechanism is swung forwardly and upwardly to such dotted line position the rod 144 will be moved endwise downwardly for pivoting the carrier 142 counter-clockwise and disposing the belt-tightening idler 139 in tightening relation with the lower flight of the "forward" belt 92. During this forward and upward displacement of the toggle mechanism, the upper leg 147 of the U-shaped bracket 145 will compress the spring 146 and after the pivot 158 crosses the center line L, the compressed spring 146 will tend to continue counter-clockwise swinging of the element 156 to a limit determined by abutment of the control element 143 with the pivot pin 155. With the "forward" belt 92 thus tightened and with the toggle mechanism retained in this over-center position, the motor will be drivingly connected with the traction wheels of the mower for causing forward movement thereof. Forward motion of the vehicle will continue until the operator exerts a rearward force on the knob 159 for swinging the toggle mechanism into the Fig. 1a position.

Rearward movement of the mower under power derived from the motor M is obtained by manual movement of the control element knob 159 rearward. This pulls the rod 144 rearwardly and upwardly and thereby rocks the idler carrier 142 clockwise, as viewed in Fig. 1, for placing the idler 141 in belt tightening relation with the upper flight of the "reverse" belt 107. As soon as the rearward manually applied force is relieved from the knob 159, the pendulously-supported toggle mechanism will swing forwardly together with the pendulous carrier 142 for reestablishing the neutral condition in which neither of the belts 92 nor 107 is tightened.

Reference is invited to my divisional application Serial No. 306,397, filed August 26, 1952, for Power-Driven Lawn Mower, claiming subject matter herein shown but not herein claimed.

Having described a preferred form of the invention with the view of clearly and concisely illustrating the same, I claim:

1. In driving and tightening apparatus for a belt; the combination of a gear box having an opening in a side wall thereof and a circular seal surface extending about such opening, a bearing carrier mounted in said side wall opening for pivotal adjustment about an axis extending perpendicularly to the plane of such opening coaxially with said circular seal surface and cooperable with such surface to provide a sealed closure for said opening, an outboard bearing on said carrier, said outboard bearing being spaced radially from said axis, a shaft journaled in the outboard bearing and having inner and outer end portions projecting endwise from such bearing respectively into the gear box and outwardly from the outer end of such bearing, a pulley mounted on and constrained for rotation with the outer end portion of said shaft and being operable complementally with the belt in power transmitting relation therewith, said pulley being revolvable about the carrier axis in one direction pursuant to pivoting of the carrier for tightening the belt to establish such power transmitting relation and being revolvable in the opposite direction pursuant to opposite pivoting of the carrier for loosening the belt and terminating such power transmitting relation, a drive gear rotatable in the gear box coaxially with the carrier axis, a companion gear meshed with said drive gear and mounted on and constrained for rotation with the inner end portion of said shaft, said drive gear being operable to transmit driving force to the companion gear for rotating the same about its axis while urging said gear, said shaft, and said bearing to revolve about the carrier axis in the direction for causing the pulley to tighten the belt, means manually operable for pivoting the carrier in the direction to revolve said pulley in the one direction for tightening the belt or alternatively pivoting the carrier in the opposite direction against the force exerted by the driving gear on the companion gear and means for yieldably retaining the carrier in the oppositely pivoted direction.

2. In driving and tightening apparatus for a belt; the combination of a frame, a gear box mounted on said frame in substantially fixed relation thereto and having a side wall opening and a circular seal surface extending about said opening, a carrier mounted in said opening for pivotal adjustment about an axis extending perpendicularly to such an opening coaxially with said circular seal surface and cooperable with such surface to provide a sealed closure for said opening, an outboard bearing on said carrier in radially spaced parallelism with such axis, a pivot bearing counterpart on a section of the outboard bearing spaced outwardly from the carrier and disposed coaxially with the carrier, a complemental pivot bearing counterpart on said frame and cooperating with the first counterpart for pivotally supporting the outer end portion of the outboard bearing so it is revolvable about the carrier axis, a shaft journalled in the outboard bearing and having inner and outer end portions projecting endwise from such bearing respectively into the gear box and outwardly from the outer end of such bearing, a pulley mounted on and constrained for rotation with the outer end portion of said shaft and being revolvable with the shaft and outboard bearing in one direction about the carrier axis for tightening the belt and establishing a power transmitting relation therewith, the pulley being revolvable oppositely for loosening the belt and terminating such power transmitting relation, a drive gear rotatable in the gear box coaxially with the carrier axis, a companion gear meshed with said drive gear and mounted on and constrained for rotation with the inner end portion of said shaft, said drive gear being operable to transmit driving force to the companion gear for rotating the same about its axis while urging said gear, said shaft, and said bearing to revolve about the carrier axis in the direction for causing the pulley to tighten the belt.

3. A motor-driven grass mower comprising a frame which includes laterally spaced side frame members, a running gear in support of said frame, a cross shaft rotatively supported in said frame, means for transmitting driving force from said cross shaft to the running gear, a motor supported on said frame and having a drive shaft projecting therefrom crosswise of the frame, a gear box having a side disposed adjacent to said motor and receiving said motor drive shaft, a pair of oppositely driven shafts projecting outwardly through the opposite wall of said gear box, means in the gear box for transmitting driving force from the motor drive shaft to said oppositely driven shafts for oppositely driving the same, belt driving pulleys respectively on and constrained for rotation respectively with said oppositely driven shafts, said pulleys being axially spaced relatively to one another, axially spaced pulleys on said cross shaft and constrained for rotation therewith, one of said axially spaced pulleys being in a plane common to one of the oppositely driven pulleys and being mated therewith, the other of the axially spaced pulleys being in a plane common with and mated with the other of the oppositely driven pulleys, each pair of the mated pulleys being adapted to having a belt trained thereover for transmitting driving force therebetween when the belt is sufficiently tightened thereon, a belt tightener structure comprising an oppositely movable member, belt tightener idlers mounted on said member and occupying positions wherein they are ineffective for tightening either of said belts while the member is in an intermediate neutral position, one of said idlers being disposed in tightening relation with one of the belts pursuant to movement of said member in one direction from neutral, and the other idler being disposed in tightening relation with the other belt pursuant to movement of the member in the opposite direction from neutral.

4. The combination set forth in claim 3, wherein said oppositely movable member of the belt tightener structure is pivotally mounted on said cross shaft and is pivotal in opposite directions from the neutral.

5. A motor-driven grass mower comprising a frame, a running gear supporting said frame, a motor supported on said frame, a power transmission unit mounted on said frame and comprising a driving member driven from said motor, said transmission unit also comprising a reverse driven shaft and a forward driven shaft, a rotatable cross shaft drivingly connected with said running gear, and driving connections between said driven shafts and the cross shaft comprising axially spaced pulleys mounted on and constrained for rotation with said cross shaft, axially spaced pulleys respectively on and constrained for rotation with said driven shafts and respectively paired with the pulleys on the cross shaft, belts respectively trained over the pairs of pulleys, said belts being normally loose so as not to transmit power between their associated paired pulleys, and a belt tightener structure comprising belt tightener idlers respectively cooperable with the belts for tightening the same, and said belt tightener structure being manipulatable from a neutral setting wherein neither of the idlers is cooperable with its belt to respective settings for alternatively placing the idlers in cooperable relation with their belts.

6. In a self-propelled implement having a frame with a transverse cross shaft rotatively mounted in a rear portion thereof and such implement being alternatively propelled forwardly or rearwardly when said shaft is rotated in respectively opposite directions; a control support on the frame rearwardly of said cross shaft, power transmitting means comprising, a first pulley on and constrained for rotation with said shaft, a driving pulley disposed in a plane common with the first pulley and forwardly thereof, a forward driving belt trained about said pulleys and tightenable thereabout into power transmitting relation therebetween to cause power transmission to the cross shaft for obtaining forward movement of the implement, a belt-tightener carrier member pivotally mounted on said cross shaft and normally depending therefrom in a position of repose, a belt-tightener idler journalled upon said carrier and disposed in contiguous non-tightening relation with respect to the belt while the carrier occupies the position of repose, said carrier being pivotal about the cross shaft in one direction from the position of repose into an operable position disposing the idler in belt-tightening relation with respect to the belt; and control means for said carrier comprising a toggle mechanism including a toggle element pivotally mounted upon said control support, and a rod element having an articulated connection with a depending portion of said pivotally mounted element and extending therefrom into pivotal connection with said carrier, said toggle mechanism being effective for rotating the carrier into its operable position incident to movement of the articulated connection across a center-line extending between the connection of the pivotally mounted element with the control support and the connection of the rod element with said carrier; and a control element connected with at least one of the toggle elements and operable responsively to a forward manually applied force for moving the articulated connections across such center-line.

7. The combination set forth in claim 6, wherein said cross shaft has a second pulley mounted on and constrained for rotation therewith in axially spaced relation from the first pulley, a second driving pulley driven reversely with respect to the first named driving pulley, a reverse driving belt trained about said second pulley and said second motor-driven pulley and tightenable thereabout into power transmitting relation therebetween to cause power transmission to the cross shaft in the direction for obtaining reverse movement of the implement, a reverse belt-tightener idler mounted on the pivoted carrier and disposed in contiguous non-tightening relation with respect to the reverse driving belt when the carrier is in the position of repose or in the one direction from repose but being placeable in tightening relation with respect to such reverse driving belt when the carrier is moved into a reversely pivoted position from the position of repose, and said manual control element being operable through the rod element of the toggle mechanism for pivoting said carrier into the reversely pivoted position responsive to a force applied to such control element in a rearward direction with respect to said frame.

References Cited in the file of this patent

UNITED STATES PATENTS

| Number | Name | Date |
|---|---|---|
| 750,874 | Mathews | Feb. 2, 1904 |

(Other references on following page)

UNITED STATES PATENTS

| Number | Name | Date |
|---|---|---|
| 804,980 | Reiss | Nov. 21, 1905 |
| 1,305,030 | Tibbetts | May 27, 1919 |
| 1,709,791 | Jerram | Apr. 16, 1929 |
| 1,764,767 | Wilhelm | June 17, 1930 |
| 2,211,260 | Donald | Aug. 13, 1940 |
| 2,247,333 | Funk | June 24, 1941 |
| 2,256,583 | Squires | Sept. 23, 1941 |
| 2,269,734 | Powell | Jan. 13, 1942 |
| 2,313,590 | Sherer, Jr., et al. | Mar. 9, 1943 |
| 2,335,054 | Godwin | Nov. 23, 1943 |
| 2,368,290 | Donald | Jan. 30, 1945 |
| 2,417,613 | Radabaugh | Mar. 18, 1947 |
| 2,445,797 | Moore | July 27, 1948 |
| 2,453,819 | Smith | Nov. 16, 1948 |
| 2,472,771 | Huelster | June 7, 1949 |
| 2,474,085 | Albright | June 21, 1949 |

FOREIGN PATENTS

| Number | Country | Date |
|---|---|---|
| 371,784 | Germany | Mar. 22, 1923 |